US012416105B2

(12) United States Patent
Ruiz Morales

(10) Patent No.: US 12,416,105 B2
(45) Date of Patent: Sep. 16, 2025

(54) NONWOVEN FABRIC SUITABLE AS A CROP COVER

(71) Applicant: Berry Global, Inc., Evansville, IN (US)

(72) Inventor: Mauricio Alonso Ruiz Morales, San Luis Potosí (MX)

(73) Assignee: MAGNERA CORPORATION, Charlotte, NC (US)

( * ) Notice: Subject to any disclaimer, the term of this patent is extended or adjusted under 35 U.S.C. 154(b) by 586 days.

(21) Appl. No.: 17/792,539

(22) PCT Filed: Jan. 28, 2021

(86) PCT No.: PCT/US2021/015458
§ 371 (c)(1),
(2) Date: Jul. 13, 2022

(87) PCT Pub. No.: WO2021/154973
PCT Pub. Date: Aug. 5, 2021

(65) Prior Publication Data
US 2023/0052132 A1 Feb. 16, 2023

Related U.S. Application Data

(60) Provisional application No. 62/967,174, filed on Jan. 29, 2020.

(51) Int. Cl.
*D01F 1/10* (2006.01)
*A01G 13/32* (2025.01)
(Continued)

(52) U.S. Cl.
CPC ............. *D01F 1/106* (2013.01); *A01G 13/32* (2025.01); *D01F 1/04* (2013.01); *D01F 6/04* (2013.01); *D04H 1/42* (2013.01); *D10B 2321/021* (2013.01); *D10B 2321/022* (2013.01); *D10B 2401/22* (2013.01); *D10B 2505/18* (2013.01)

(58) Field of Classification Search
None
See application file for complete search history.

(56) References Cited

U.S. PATENT DOCUMENTS 10,617,068 B2 * 4/2020 Pano ..................... B32B 5/022

FOREIGN PATENT DOCUMENTS

EP          0500073 A2      8/1992
WO   WO-20000020209 A1    4/2000
(Continued)

OTHER PUBLICATIONS

International Search Report and Written Opinion from international application No. PCT/US2021/015458 mailed on May 17, 2021, all pages enclosed cited in its entirety.
(Continued)

Primary Examiner — Arti Singh-Pandey
(74) Attorney, Agent, or Firm — BURR & FORMAN

(57) ABSTRACT

Non woven fabrics including at least one nonwoven layer comprising a plurality of fibers comprising a polymeric material having a melt flow rate (MFR) of less than about 40 g/10 min according to ASTM D1238 (2.16 kg at 230° C.) are provided. The plurality of fibers includes (i) one or more ultraviolet radiation protective agents (UVPA), and (ii) one or more inorganic pigments comprising an inert coating thereon.

20 Claims, 5 Drawing Sheets

(51) Int. Cl.
    *D01F 1/04*    (2006.01)
    *D01F 6/04*    (2006.01)
    *D04H 1/42*    (2012.01)

(56) References Cited

FOREIGN PATENT DOCUMENTS

WO    WO-20140041499 A1    3/2014
WO    WO-20160126976 A1    8/2016

OTHER PUBLICATIONS

Second Written Opinion from international application No. PCT/US2021/015458 mailed on Dec. 17, 2021, all pages enclosed cited in its entirety.
Third Written Opinion from international application No. PCT/US2021/015458 mailed on Mar. 21, 2022, all pages enclosed cited in its entirety.
International Preliminary Report on Patentability for international application No. PCT/US2021/015458 mailed on May 18, 2022, all pages enclosed cited in its entirety.

* cited by examiner

NONWOVEN FABRIC SUITABLE AS A CROP COVER

CROSS-REFERENCE TO RELATED APPLICATIONS

This application is a U.S. national stage entry of International Application No. PCT/US2021/015458 filed Jan. 28, 2021, which claims priority from U.S. Provisional Patent Application No. 62/967,174 filed Jan. 29, 2020, and claims the benefit of the its earlier filing date under 35 U.S.C. 119 (e). Each of International Application No. PCT/US2021/015458 and U.S. Provisional Patent Application No. 62/967,174 are incorporated herein by reference in their entirety.

TECHNICAL FIELD

Embodiments of the presently-disclosed invention relate generally to nonwoven fabrics that may be particularly suitable for use as a crop cover, in which the nonwoven fabric comprises a plurality of fibers formed from a polymeric material having a melt flow rate (MFR) of less than about 40 g/10 min and includes (i) one or more ultraviolet radiation protective agents (UVPA), and (ii) one or more inorganic pigments comprising an inert coating thereon.

BACKGROUND

Crop covers have been used commercially in the agriculture field to enhance plant growth for decades. Materials for crop covers, such as films, nonwovens, or woven materials, may be placed above a crop planting site to protect the site from birds, insects, rain, hail, wind and excessive sun. For example, woven or film crop covers are used in the agriculture field for a variety of purposes, such as weed suppression and soil retention. In some instances, nonwovens may be utilized as crop covers, in which the nonwovens are designed to let rain and irrigation through, while holding in heat. Moreover, nonwovens utilized as a crop cover can provide protection against a variety of insects, including homoptera, thrips, aphid, psyllidae, acari, coleoptera, diptera, and/or lepidoptera, that can damage or infect crops. Nonwoven-based crop covers, however, may be susceptible to tearing and/or degradation over time due to exposure to ultraviolet (UV) radiation and/or physical manipulation by wind and/or movement associated with inspecting the growth of crops.

There at least remains a need in the art, however, for a more robust nonwoven fabric suitable for crop coverage applications.

SUMMARY

One or more embodiments of the invention may address one or more of the aforementioned problems. Certain embodiments according to the invention provide nonwoven fabrics including at least one nonwoven layer comprising a plurality of fibers comprising a polymeric material having a melt flow rate (MFR) of less than about 40 g/10 min according to ASTM D1238 (2.16 kg at 230° C.) are provided. The plurality of fibers includes (i) one or more ultraviolet radiation protective agents (UVPA), and (ii) one or more inorganic pigments comprising an inert coating thereon.

In another aspect, the present invention provides a method of forming a nonwoven fabric as disclosed and described herein. In accordance with certain embodiments of the invention, for instance, the method may comprise forming at least a first nonwoven layer comprising a plurality of fibers, in which the plurality of fibers comprises a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon. The method may further comprise consolidating the first nonwoven layer to provide a nonwoven fabric as disclosed and described herein.

In another aspect, the present invention provides a method enhancing crop growth. In accordance with certain embodiments of the invention, the method may comprise covering a crop planting site with a nonwoven fabric as described and disclosed herein. In accordance with certain embodiments of the invention, the method of enhancing crop growth comprises applying the nonwoven fabric directly or indirectly (e.g., draped over an overhanging structure) over the crop planting site, which may comprise one or more crops planted thereon. In accordance with certain embodiments of the invention, the nonwoven fabric includes at least one nonwoven layer comprising a plurality of fibers comprising a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon.

In yet another aspect, the present invention provides a crop planting site including a plurality of crops planted thereon. The crop planting site may comprise one or more nonwoven fabrics disposed directly or indirectly over planted-portions of the crop planting site having one or more crops planted thereon. For example, the planted-portions may comprise a plurality of rows that are directly or indirectly covered by the nonwoven fabric(s). In accordance with certain embodiments of the invention, the nonwoven fabric includes at least one nonwoven layer comprising a plurality of fibers comprising a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
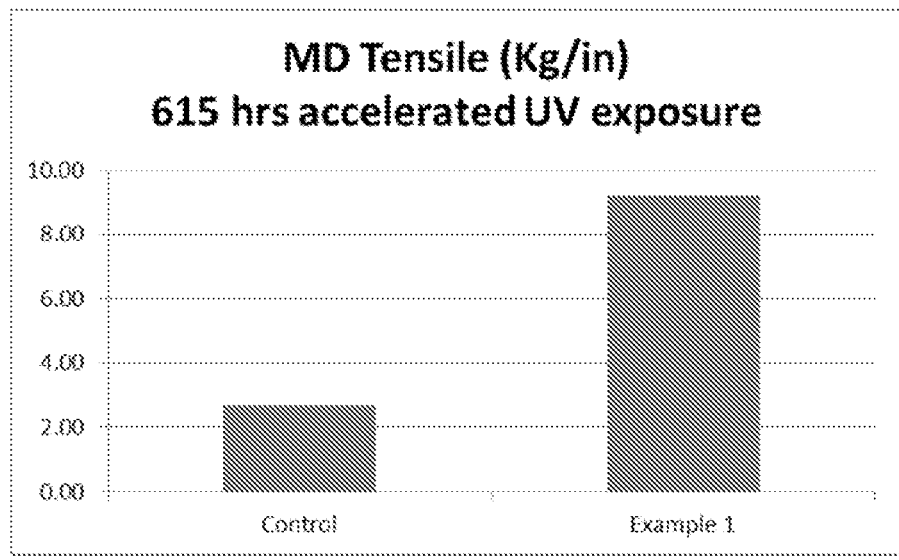
FIG. 1 shows a graph comparing the machine-direction tensile strength for a control nonwoven fabric and an example nonwoven fabric after each has been subjected to accelerated ageing.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to nonwoven fabrics suitable as crop covers, in which the nonwoven fabrics have improved resistance to UV degradation and/or improved physical properties that may enable an extended use of a single nonwoven fabric as a crop cover. In accordance with certain embodiments of the invention, the nonwoven fabrics exhibit an improved tensile strength and/or lifespan compared to nonwoven fabrics devoid of the combination of lower MFR fibers, one or more ultraviolet radiation protective agents (UVPA), and one or more inorganic pigments comprising an inert coating thereon as disclosed and described herein. For example, nonwoven fabrics embodied as a crop cover may exhibit a 10-30% improvement in tensile strength and/or a 10-50% improvement in lifespan in an agricultural field.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The term "layer", as used herein, may comprise a generally recognizable combination of similar material types and/or functions existing in the X-Y plane.

The term "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to mechanically entangle, thermally bond, or otherwise bond, at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "multi-component fibers", as used herein, may comprise fibers formed from at least two different polymeric materials or compositions (e.g., two or more) extruded from separate extruders but spun together to form one fiber. The term "bi-component fibers", as used herein, may comprise fibers formed from two different polymeric materials or compositions extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fiber may be, for example, a sheath/core arrangement wherein one polymer is surrounded by another, an eccentric sheath/core arrangement, a side-by-side arrangement, a pie arrangement, or an "islands-in-the-sea" arrangement, each as is known in the art of multicomponent, including bicomponent, fibers.

The term "machine direction" or "MD", as used herein, comprises the direction in which the fabric is produced or conveyed. The term "cross-direction" or "CD", as used herein, comprises the direction of the fabric substantially perpendicular to the MD.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

As used herein, the term "aspect ratio", comprise a ratio of the length of the major axis to the length of the minor axis of the cross-section of the fiber in question.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers. In accordance with certain embodiments of the invention, meltblown fibers may comprise or be formed from a polymeric composition (e.g., polymeric resin) having a melt flow rate (MFR), for example, of from about 400 g/10 min to about 2,000 g/10 min according to ASTM D1238 (2.16 kg at 230° C.), such as from at least about any of the following: 400, 500, 600, 700, 800, 900, 1000, 1200, 1400, and 1500 g/10 min and/or from at most about any of the following: 2000, 1900, 1800, 1700, 1600, 1500, 1400, 1200, and 1000 g/10 min according to ASTM D1238 (2.16 kg at 230° C.).

The term "tunnel", as used herein, may comprise a structure including supports, such as arcs of metallic wire, that support a nonwoven cover above one or more rows of crops. In this regard, a "micro-tunnel" may include a structure having supports, such as arcs of metallic wire that hold a nonwoven cover above a single row of the crop without touching it. A "macro-tunnel" may include a structure having supports, such as arcs of metallic wire, that hold a nonwoven cover above several rows of crops without touching them.

The term "floating cover", as used herein, may mean that the nonwoven is in direct contact with the crop.

The term "plastic mulch", as used herein, may comprise a covering material that is typically formed by a film material (i.e., not a nonwoven fabric), such as a polyethylene film. The "plastic mulch" may be in contact with the soil and is perforated to facilitate the growth of the plant in isolation from weeds.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the invention provides a nonwoven fabric including at least one nonwoven layer comprising a plurality of fibers comprising a polymeric material having a melt flow rate (MFR) of less than about 40 g/10 min according to ASTM D1238 (2.16 kg at 230° C.) are provided. The plurality of fibers includes (i) one or more ultraviolet radiation protective agents (UVPA), and (ii) one or more inorganic pigments comprising an inert coating thereon. In accordance with certain embodiments of the invention, the MFR comprises from about 5 g/10 min to about 40 g/10 min, such as from at least about any of the following: 5, 6, 7, 8, 9, 10, 12, 14, 16, 18, 20, 22, 24, and 25 g/10 min and/or from at most about any of the following: 40, 35, 32, 30, 29, 28, 27, 26, and 25 g/10 min according to ASTM D1238 (2.16 kg at 230° C.).

The plurality of fibers including the combination of the one or more UVPAs and the one or more inorganic pigments comprising an inert coating thereon may comprise a synthetic polymeric material. In accordance with certain embodiments of the invention, for example, the polymeric material may comprise a polyolefin, a polyamide, a polyethylene terephthalate, or combinations thereof. For instance, the synthetic polymeric material may comprise a blend of two or more synthetic polymers. In accordance with certain embodiments of the invention, the polymeric material may comprise a polyolefin, such as a polypropylene, a polypropylene copolymer, a polyethylene, a polyethylene copolymer, or any combination thereof. By way of example, the polymeric material may comprise or consist of an isotactic polypropylene homopolymer.

As noted above, the nonwoven fabrics including a plurality of fibers having a combination of one or more UVPAs and one or more inorganic pigments comprising an inert coating thereon. In accordance with certain embodiments of the invention, the one or more UVPAs comprise a hindered amine light stabilizer (HALS), such as a 'N—H'-HALS, a 'N—R'-HALS, a 'N—OR'-HALS, or any combination thereof, in which 'N' is a nitrogen atom, 'H' is a hydrogen atom, and 'R' comprises a saturated aliphatic radical, an unsaturated aliphatic radical, a saturated aromatic radical, or an unsaturated aromatic radical. In accordance with certain embodiments of the invention, the one or more UVPAs comprise a 'N—R'-HALS and/or a 'N—OR'-HALS and 'R' independently comprises from 1 to about 30 carbon atoms, such as from at least about any of the following: 1, 2, 3, 4, 5, 6, 8, 10, 15, 18, and 20 carbon atoms and/or from at most about any of the following: 30, 28, 26, 24, 22, and 20 carbon atoms.

In according with certain embodiments of the invention, the one or more UVPAs may comprise a HALS having an average molecular weight from about 2000 g/mol to about 5000 g/mol, such as from at least about any of the following: 2000, 2200, 2400, 2600, 2800, 3000, 3200, 3400, and 3600 g/mol and/or from at most about any of the following: 5000, 4800, 4600, 4400, 4200, 4000, 3800, and 3600 g/mol. The average molecular weight, for example, may comprise the average molecular weight for a plurality of different HALS-type UVPAs.

Not limiting example of UVPAs in accordance with certain embodiments of the invention may include the following:

(II): Poly [[6-[(1,1,3,3-tetramethylbutyl)amino]-1,3, 5-triazine-2,4-diyl][(2,2,6,6-tetramethyl-4-piperidinyl)imino]-1,6-hexanediyl [(2,2,6,6-tetramethyl-4-piperidinyl)imino]]) Butanedioic acid, dimethylester, polymer with 4-hydroxy-2,2,6,6-tetramethyl-1-piperidine ethanol

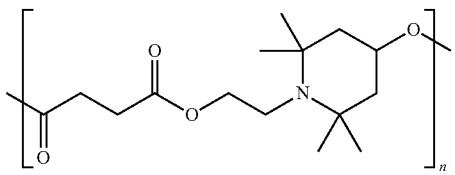

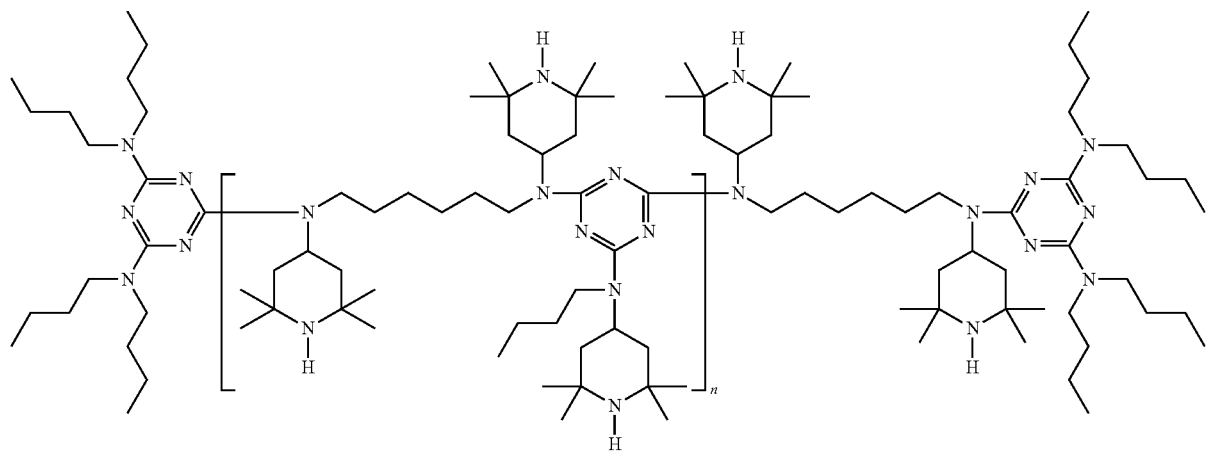

(I): 1,6-Hexanediamine, N,N'-bis(2,2,6,6-tetramethyl-4-piperidinyl)-polymer with 2,4,6-trichloro-1, 3,5-triazine, reaction products with N-butyl-1-butanamine and N-butyl-2,2,6,6-tetramethyl-4-piperidinamine (III): Butanedioic acid, dimethylester, polymer with 4-hydroxy-2,2,6,6-tetramethyl-1-piperidine ethanol

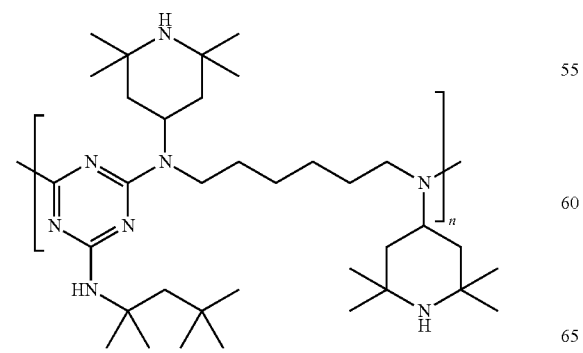

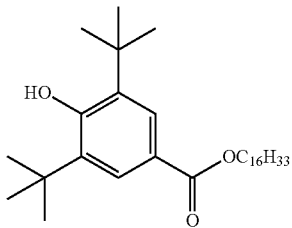

(IV): Hexadecyl 3,5-bis-tert-butyl-4-hydroxybenzoate

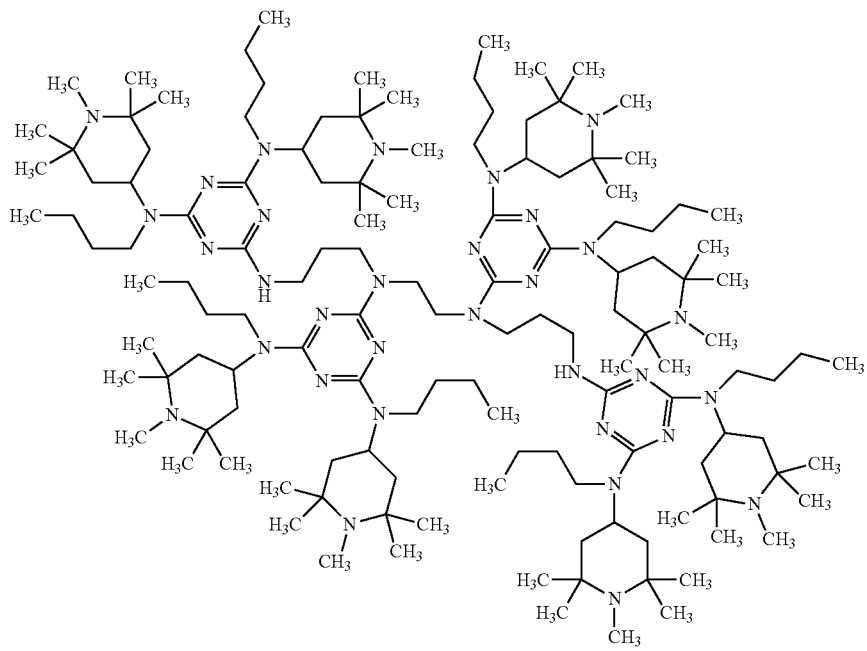 [SMILES: CCCCN(c1nc(NCCCN(CCN(CCCNc2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)c2nc(N(CCCC)C3CC(C)(C)N(C)C(C)(C)C3)nc(N(CCCC)C3CC(C)(C)N(C)C(C)(C)C3)n2)nc(N(CCCC)C2CC(C)(C)N(C)C(C)(C)C2)n1)C1CC(C)(C)N(C)C(C)(C)C1]

(V): 1,5,8,12-Tetrakis [4,6-bis(N-butyl-N-1,2,2,6,6-pentamethyl-4-piperidylamino)-1,3,5-triazin-2-yl]-1,5,8,12-tetraazadodecane; and

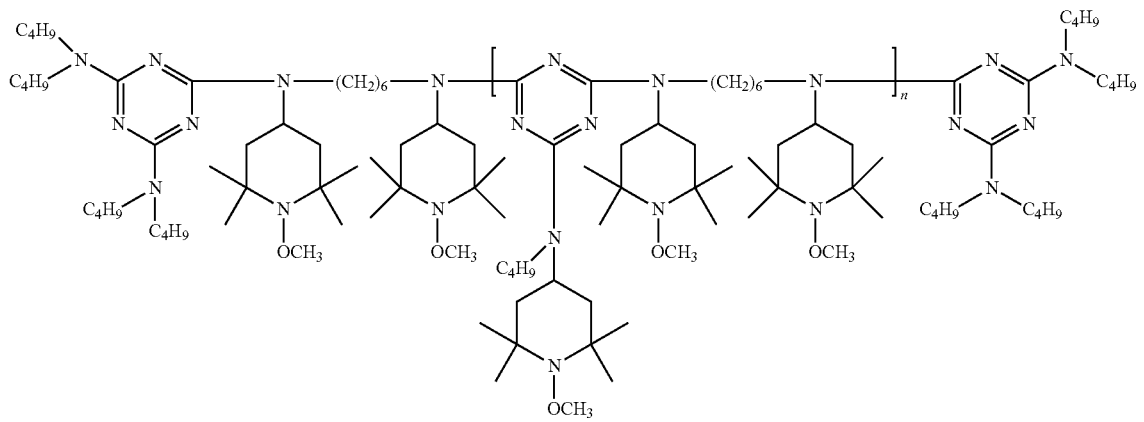

(VI): 1,6-hexanediamine, N,N'-bis(2,2,6,6-tetramethyl-4-piperidinyl), polymer with 2,4,6-trichloro-1,3,5-triazine, reaction products with 3-bromo-1-propene,n-butyl-1-butanamine and N-butyl-2,2,6,6-tetramethyl-4-piperidinamine, Oxidised, Hydrogenated In accordance with certain embodiments of the invention, the plurality of fibers may comprise from about 0.02% to about 20% by weight of the one or more UVPAs, such as from at least about any of the following: 0.02, 0.05, 0.08, 0.1, 0.15, 0.175, 0.2, 0.3, 0.4, 0.5, 0.6, 0.7, 0.8, 0.9, 1.0, 1.2, 1.5, 1.8, 2, 2.5, 3, 3.5, 4, 5, 6, 8, 10, and 12% by weight of the one or more UVPAs and/or from at most about any of the following: 20, 18, 16, 14, 12, and 10% by weight of the one or more UVPAs (e.g., 0.175% to 1% by weight of the one or more UVPAs). In accordance with certain embodiments of the invention, the nonwoven fabric may comprise from about 0.001% to about 20% by weight of the one or more UVPAs, such as from at least about any of the following: 0.001, 0.005, 0.01, 0.02, 0.05, 0.08, 0.1, 0.15, 0.175, 0.2, 0.3, 0.4, 0.5, 0.6, 0.7, 0.8, 0.9, 1.0, 1.2, 1.5, 1.8, 2, 2.5, 3, 3.5, 4, 5, 6, 8, 10, and 12% by weight of the one or more UVPAs and/or from at most about any of the following: 20, 18, 16, 14, 12, and 10% by weight of the one or more UVPAs (e.g., 0.175% to 1% by weight of the one or more UVPAs).

As noted above, the nonwoven fabrics including a plurality of fibers having a combination of one or more UVPAs and one or more inorganic pigments comprising an inert coating thereon. In accordance with certain embodiments of the invention, the one or more inorganic pigments comprise titanium dioxide particles, such as rutile form, anatase form, brookite form, hollandite-like form, ramsdellite-like form, akaogite form, or cubic form. For example, the titanium dioxide particles may have a tetragonal crystal structure, an orthorhombic crystal structure, a monoclinic crystal structure, or a cubic crystal structure. The inert coating, for example, may comprise a silicon oxide, such as $SiO_2$; an aluminum oxide, such as $Al_2O_3$; or a zirconium oxide, such as $ZrO_2$.

In accordance with certain embodiments of the invention, the titanium dioxide particles may have an average diameter from about 0.1 microns to about 10 microns, such as from at least about any of the following: 0.1, 0.15, 0.2, 0.3, 0.4, 0.5, 0.6, 0.7, 0.8, 0.9, 1.0, 1.2, 1.5, 1.8, 2, 2.5, 3, 3.5, 4, and 5 microns and/or from at most about any of the following: 10, 9, 8, 7, 6, and 5 microns.

In accordance with certain embodiments of the invention, the plurality of fibers may comprise from about 0.02% to about 20% by weight of the one or more inorganic pigments, such as from at least about any of the following: 0.02, 0.03, 0.04, 0.05, 0.06, 0.07, 0.08, 0.09, 0.1, 0.15, 0.2, 0.3, 0.4, 0.5, 0.6, 0.7, 0.8, 0.9, 1.0, 1.2, 1.5, 1.8, 2, 2.5, 3, 3.5, 4, 5, 6, 8, 10, and 12% by weight of the one or more inorganic pigments and/or from at most about any of the following: 20, 18, 16, 14, 12, and 10% by weight of the one or more inorganic pigments (e.g., 0.07% to 0.7% by weight of the one or more inorganic pigments). In accordance with certain embodiments of the invention, the nonwoven fabric may comprise from about 0.001% to about 20% by weight of the one or more inorganic pigments, such as from at least about any of the following: 0.001, 0.005, 0.01, 0.02, 0.05, 0.08, 0.1, 0.15, 0.175, 0.2, 0.3, 0.4, 0.5, 0.6, 0.7, 0.8, 0.9, 1.0, 1.2, 1.5, 1.8, 2, 2.5, 3, 3.5, 4, 5, 6, 8, 10, and 12% by weight of the one or more UVPAs and/or from at most about any of the following: 20, 18, 16, 14, 12, and 10% by weight of the one or more inorganic pigments (e.g., 0.07% to 0.7% by weight of the one or more inorganic pigments).

The nonwoven fabric, in accordance with certain embodiments of the invention, may comprise a ratio between the one or more UVPAs and the one or more inorganic pigments from about 100:1 to about 10:1 based on weight, such as at least about any of the following: 10:1, 15:1, 20:1, 25:1; 30:1, 35:1, 40:1, 45:1, and 50:1 based on weight and/or at most about any of the following: 100:1, 90:1, 80:1, 70:1, 60:1, and 50:1 based on weight.

The plurality of fibers including the combination of one or more UVPAs and one or more inorganic pigments comprising an inert coating thereon may comprise spunbond fibers, meltblown fibers, staple fibers, or any combination thereof. For example, the plurality of fibers may comprise continuous spunbond fibers. In accordance with certain embodiments of the invention, the plurality of fibers may comprise monocomponent fibers and/or multi-component fibers (e.g., sheath and core, side-by-side, islands-in-a-sea, etc.). In accordance with certain embodiments of the invention, the combination of one or more UVPAs and one or more inorganic pigments comprising an inert coating thereon may be located in only a single component (or every component) of a multi-component fiber, such disposed within the sheath component only or the core component only. In accordance with certain embodiments of the invention, the one or more UVPAs and the one or more inorganic pigments may be distributed throughout a cross-section of the plurality of fibers, such as homogeneously throughout the cross-section of the fibers. In accordance with certain embodiments of the invention, the plurality of fibers including the combination of one or more UVPAs and one or more inorganic pigments comprising an inert coating thereon may have a round (e.g., fibers having an average an aspect ratio from at least 0.8 to 1.2, such as 1.0+/−0.1) or non-round cross-section, which may have an aspect ratio of 1.5 or larger. As used herein, the term "aspect ratio", comprise a ratio of the length of the major axis to the length of the minor axis of the cross-section of the fiber in question. In accordance with certain embodiments of the invention, the plurality of fibers including the combination of one or more UVPAs and one or more inorganic pigments comprising an inert coating thereon may comprise an average diameter from about 1 to about 30 microns, such as at least about any of the following: 1, 3, 5, 8, 10, 12, 15, 18, and 20 microns and/or at most about any of the following: 30, 25, 22, 20, 18, and 15 microns.

In accordance with certain embodiments of the invention, the nonwoven fabric comprises one or more nonwoven layers, in which at least one of the nonwoven layers includes the plurality of fibers including the combination of one or more UVPAs and one or more inorganic pigments comprising an inert coating thereon. For example, the nonwoven fabric may comprise two or more nonwoven layers, in which all or at least one of the nonwoven layers includes the combination of one or more UVPAs and one or more inorganic pigments comprising an inert coating thereon. By way of example only, the nonwoven fabric may comprise a first spunbond nonwoven layer including a plurality of continuous fibers comprising the combination of one or more UVPAs and one or more inorganic pigments comprising an inert coating thereon and a second nonwoven layer that may be a spunbond or meltblown layer.

The nonwoven fabric, in accordance with certain embodiments of the invention, may have a basis weight from about 5 to about 40 grams-per-square meter (gsm), such as from at least about any of the following: 5, 6, 7, 8, 9, 10, 11, 12, 13, 14, and 15 gsm and/or from at most about any of the following: 40, 35, 30, 25, 20, 18, 16, 15, 14, 13, and 12 gsm.

In accordance with certain embodiments of the invention, the nonwoven fabric comprises a thickness from about 1 to about 12 mils, such as from at least about any of the following: 1, 2, 3, 4, 5, 6, 7, and 8 mils and/or from at most about any of the following: 12, 11, 10, 9, and 8 mils.

The nonwoven fabric, in accordance with certain embodiments of the invention, may have a machine-direction grab tensile strength from about 2 to about 20 lb/in according to INDA/EDANA Test Method WSP 100.1 or Test Method ASTM D5034, such as from at least about any of the following: 2, 3, 4, 5, 6, 7, 8, 9, 10, 11, and 13 lb/in and/or from at most about any of the following: 20, 19, 18, 17, 16, 15, 14, 13, 12, 11, and 10 lb/in according to INDA/EDANA Test Method WSP 100.1 or Test Method ASTM D5034. The nonwoven fabric may have a cross-direction grab tensile strength from about 1 to about 15 lb/in according to INDA/EDANA Test Method WSP 100.1 or Test Method ASTM D5034, such as from at least about any of the following: 1, 2 3, 4, 5, 6, 7, 8, 9, and 10 lb/in and/or from at most about any of the following: 15, 14, 13, 12, 11, 10, 9, 8, and 7 lb/in according to INDA/EDANA Test Method WSP 100.1 or Test Method ASTM D5034.

The nonwoven fabric, in accordance with certain embodiments of the invention, may have a machine-direction tear value from about 1 to about 15 lb according to INDA/EDANA Test Method WSP 100.2 or Test Method ASTM 5733, such as from at least about any of the following: 1, 2, 3, 4, 5, 6, 7, 8, 9, and 10 lb and/or from at most about any of the following: 15, 14, 13, 12, 11, 10, 9, 8, and 7 lb according to INDA/EDANA Test Method WSP 100.2 or Test Method ASTM 5733. The nonwoven fabric may have a cross-direction tear value from about 1 to about 15 lb according to INDA/EDANA Test Method WSP 100.2 or Test Method ASTM 5733, such as from at least about any of the following: 1, 2, 3, 4, 5, 6, 7, 8, 9, and 10 lb and/or from at most about any of the following: 15, 14, 13, 12, 11, 10, 9, 8, and 7 lb according to INDA/EDANA Test Method WSP 100.2 or Test Method ASTM 5733.

The nonwoven fabric, in accordance with certain embodiments of the invention, may be subjected to accelerated UV exposure for 615 hours and have an after-exposure machine-direction grab tensile strength that is from about 2% to about 40% less than an initial machine-direction grab tensile strength, such as at least from about 2, 3, 4, 5, 6, 7, 8, 9, 10, 12, 15, 20, 25, and 30% less than an initial machine-direction grab tensile strength and/or from at most about any of the following: 40, 35, 30, 25, 22, 20, 18, 15, 14, 13, 12, 11, 10, 9, 8, and 7% less than an initial machine-direction grab tensile strength. The nonwoven fabric, in accordance with certain embodiments of the invention, may be subjected to accelerated UV exposure for 615 hours and have an after-exposure cross-direction grab tensile strength that is from about 2% to about 40% less than an initial cross-direction grab tensile strength, such as at least from about 2, 3, 4, 5, 8, 10, 12, 15, 18, 20, 25, and 30% less than an initial cross-direction grab tensile strength and/or from at most about any of the following: 40, 35, 30, 25, 24, 23, 22, 21, and 20% less than an initial cross-direction grab tensile strength. In accordance with certain embodiments of the invention, the nonwoven fabric comprises an after-exposure machine-direction grab tensile strength-per-basis weight (TPBW) values from about 0.5 to about 2.4 lb/in/gsm, such as from at least about any of the following: 0.5, 0.6, 0.7, 0.75, 0.8, 1, 1.2, and 1.5 lb/in/gsm and/or from at most about any of the following: 2.4, 2.2, 2, 1.8, 1.6, 1.4, 1.2, 1.1, 1, 0.9, 0.8, and 0.75 lb/in/gsm. In accordance with certain embodiments of the invention, the nonwoven fabric has an after-exposure cross-direction grab tensile strength-per-basis weight (TPBW) values from about 0.3 to about 1.6 lb/in/gsm, such as from at least about any of the following: 0.3, 0.35, 0.4, 0.45, 0.5, 0.8, 1, and 1.2 lb/in/gsm and/or from at most about any of the following: 1.6, 1.5, 1.4, 1.3, 1.2, 1.1, 1, 0.8, 0.75, 0.7, 0.65, 0.6, 0.55, and 0.5 lb/in/gsm.

The nonwoven fabric, in accordance with certain embodiments of the invention, has an average air permeability of no greater than 13,000 l/m$^2$/s according to Test Method INDA/EDANA WSP 70.1 or ASTM D737, such as from at least about any of the following: 1000, 2000, 3000, 4000, 4500, 5000, 5500, 6000, 6500, 7000, 8000, and 9000 l/m$^2$/s and/or from at most about any of the following: 13000, 12000, 11000, 10000, 9000, and 8000 l/m$^2$/s according to Test Method INDA/EDANA WSP 70.1 or ASTM D737.

In accordance with certain embodiments of the invention, the nonwoven fabric is positioned over at least a portion of a crop planting site and provides an air temperature insulative protection from about 1 to about 30° C., more than uncovered crops, such as at least about any of the following: 1, 2, 4, 6, 8, 10, 12, 14, 16, 18, and 20° F. and/or from at most about any of the following: 30, 28, 26, 25, 24, 22, and 20° C.

In accordance with certain embodiments of the invention, the nonwoven fabric is positioned over at least a portion of a crop planting site and provides a soil temperature insulative protection from about 1 to about 30° C., more than uncovered crops, such as at least about any of the following: 1, 2, 4, 6, 8, 10, 12, 14, 16, 18, and 20° F. and/or from at most about any of the following: 30, 28, 26, 25, 24, 22, and 20° C.

In accordance with certain embodiments of the invention, the nonwoven fabric is positioned directly (as a floating cover) or indirectly (as a tunnel) over the top of one or more crops, such as but not limited to watermelons, muskmelons, squash, chili pepper, strawberries, cucumber, potato, bananas or cucurbitaceous crops, that have been planted on the crop planting site.

In another aspect, the present invention provides a method of forming a nonwoven fabric as disclosed and described herein. In accordance with certain embodiments of the invention, for instance, the method may comprise forming at least a first nonwoven layer comprising a plurality of fibers, in which the plurality of fibers comprises a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon. The method may further comprise consolidating the first nonwoven layer to provide a nonwoven fabric as disclosed and described herein.

In accordance with certain embodiments of the invention, the method of forming a nonwoven fabric may comprise forming a nonwoven web of meltspun fibers (e.g., continuous spunbond fibers or meltblown fibers) including the plurality of fibers including the combination of one or more UVPAs and one or more inorganic pigments comprising an inert coating thereon, followed by consolidating the nonwoven web. Consolidation of the nonwoven web, for example, may comprise a step of mechanical bonding (e.g., needle-punching or hydroentanglement), thermal bonding (e.g., through-air-bonding, thermal calendering, or ultrasonic bonding), or adhesive bonding, to form the nonwoven fabric. As noted above, the nonwoven fabric may comprise one or more nonwoven layers. In this regard, the nonwoven layer including the plurality of fibers including the combination of one or more UVPAs and one or more inorganic pigments comprising an inert coating thereon may be bonded to one or more additional nonwoven layers, which may also comprise fibers including a combination of at least one UVPA and at least one pigment comprising an inert coating thereon or be devoid of such fibers.

In accordance with certain embodiments of the invention, the method of forming a nonwoven fabric may comprise forming a polymeric melt including (i) a polymeric material as described and disclosed herein, (ii) one or more UVPAs, and (iii) one or more inorganic pigments comprising an inert coating thereon. The polymeric melt may then be formed into a plurality of fibers as described and disclosed herein.

In another aspect, the present invention provides a method enhancing crop growth. In accordance with certain embodiments of the invention, the method may comprise covering a crop planting site with a nonwoven fabric. In accordance with certain embodiments of the invention, the method of enhancing crop growth comprises applying the nonwoven fabric directly or indirectly (e.g., draped over an overhanging structure) over the crop planting site, which may comprise one or more crops planted thereon. In accordance with certain embodiments of the invention, the nonwoven fabric includes at least one nonwoven layer comprising a plurality of fibers comprising a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon.

In accordance with certain embodiments of the invention, the crop planting site comprises one or more, such as but not limited to watermelons, muskmelons, squash, chili pepper, strawberries, cucumber, potato, bananas or cucurbitaceous crops.

The step of covering the crop planting site or a portion thereof comprises applying the nonwoven fabric directly or indirectly over the crop planting site prior to emergence of the one or more crops. In this regard, the nonwoven fabric may be positioned such that the nonwoven fabric is in direct contact with one or more of the crops. The nonwoven fabric may also be positioned indirectly over one or more crops such that a layer of air is located between the nonwoven layer and the crops. In accordance with certain embodiments of the invention, the covering of the crop planting site may comprise applying the nonwoven fabric directly or indirectly over the crop planting site after emergence of the one or more crops.

In accordance with certain embodiments of the invention, the nonwoven fabric overlies the crop planting site or portion thereof for a total time period of at least about 1800 hours, such as from at least about any of the following: 1800, 2000, 2200, 2400, 2600, 2800, and 3000 hours and/or from at most about any of the following: 6000, 5500, 5000, 4500, 4000, 3500, and 3000 hours. The method, in accordance with certain embodiments, may further comprise inspecting the one or more crops prior to expiration of the total time period. Inspecting the one or more crops, for example, may comprise removing at least a portion of the nonwoven fabric, viewing the one or more crops, and re-applying the nonwoven fabric directly or indirectly over the top of the crop planting site. In accordance with certain embodiments of the invention, the method may also comprise harvesting one or more crops.

In yet another aspect, the present invention provides a crop planting site including a plurality of crops planted thereon. The crop planting site may comprise one or more nonwoven fabrics disposed directly or indirectly over planted-portions of the crop planting site having one or more crops planted thereon. For example, the planted-portions may comprise a plurality of rows that are directly or indirectly covered by the nonwoven fabric(s). In accordance with certain embodiments of the invention, the nonwoven fabric includes at least one nonwoven layer comprising a plurality of fibers comprising a polymeric material having a melt flow rate (MFR) of less than about 40 g/10 min according to ASTM D1238 (2.16 kg at 230° C.). The plurality of fibers includes (i) one or more ultraviolet radiation protective agents (UVPA), and (ii) one or more inorganic pigments comprising an inert coating thereon.

Examples

The present disclosure is further illustrated by then following examples, which in no way should be construed as being limiting. That is, the specific features described in the following examples are merely illustrative and not limiting.

I. Mechanical Properties and Accelerated Aging

Figure 2:
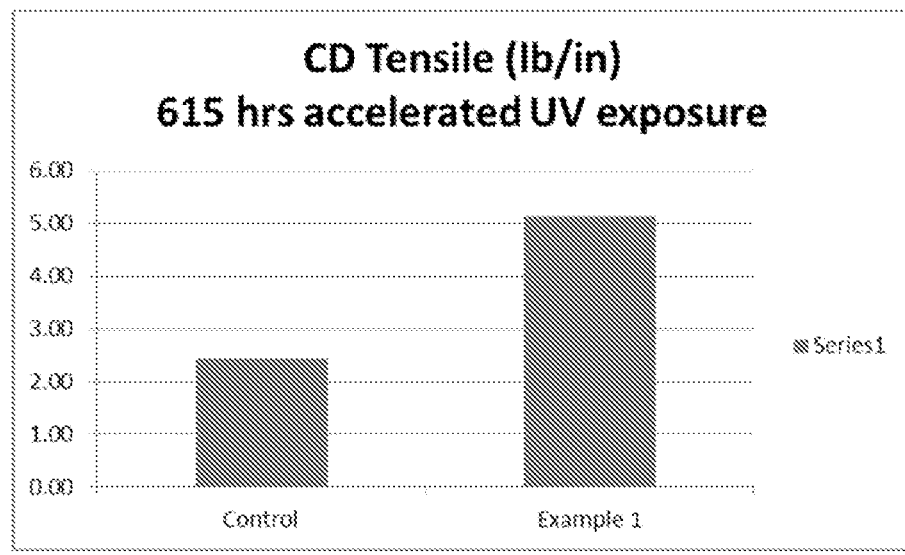
FIG. 2 shows a graph comparing the cross-direction tensile strength for a control nonwoven fabric and an example nonwoven fabric after each has been subjected to accelerated ageing.

A standard spunbond nonwoven, which is identified as "Control" in FIGS. 1 and 2, was prepared for purposes of providing a comparison with a nonwoven fabric in accordance with certain embodiments of the invention, which is identified as Example 1 in FIGS. 1 and 2. The Control sample was formed from a polypropylene having a 35 MFR and included 3.5 wt. % of a HALS. An intermediate nonwoven fabric was formed in an identical manner as the Control, but used a 25 MFR polypropylene and the same HALS at the same weight percentage. Example 1 was a spunbond nonwoven fabric formed in the identical manner as the Control, but utilized the 25 MFR polypropylene and and $TiO_2$ coated pigment as described and disclosed herein.

Tables 1 and 2 below summarize some of the pertinent results. Table 1 illustrates improvement in mechanical properties realized by lowering the resin MFR from 35 to 25. As shown in Table 2 and illustrated in FIGS. 1 and 2, Example 1 exhibited a substantially less reduction in machine-direction and cross-direction tensile strength after accelerated ageing. The accelerated ageing conditions were conducted in a QUV weather-o-meter chamber. Cycle conditions were as follows: UV Temp=70° C. for 8 hours; Condensation Temperature=50° C. for 4 hours; Irradiation=1.35 W/m²/min with a 340 nm lamp; and test length was 615 hours. These results were obtained in accordance with the "Standard Practice for Operating Florescent Light Apparatus for UV Exposure of nonmetallic materials ASTM G 154 Cycle 4", operating standard "Operating Light and Water-Exposure apparatus (Fluorescent UV-condensation type) for exposure of nonmetallic materials ASTM G53-77", and "Standard practice for Fluorescent UV Exposure of Plastics ASTM D4329". For all the samples illustrated in Tables 1 and 2, the samples were protected with 3.5% by weight of the same UV additive system, which consisted of a mix of 20% by weight of Chimassorb 119 (i.e., Poly [[6-[(1,1,3,3-tetramethylbutyl)amino]-1,3,5-triazine-2,4-diyl][(2,2,6,6-tetramethyl-4-piperidinyl)imino]-1,6-hexanediyl [(2,2,6,6-tetramethyl-4-piperidinyl)imino]])) and 5% by weight of Cyasorb 2908 (i.e., Hexadecyl 3,5-bis-tert-butyl-4-hydroxybenzoate).

TABLE 1

MFR effect on mechanical properties

| Property | Units | 35 MFR, Initial properties | 25 MFR, initial properties | Resin MFR-change improvement |
|---|---|---|---|---|
| MD Grab Tensile | (Kg/in) | 3.96 | 4.67 | 18% |
| CD Grab Tensile | (Kg/in) | 2.75 | 2.97 | 8% |
| MD Tear | (Kg) | 2.52 | 2.83 | 13% |
| CD Tear | (Kg) | 1.33 | 1.79 | 35% |

Note:
Data = 30 points. Table 1 shows the improvement in mechanical properties by lowering the resin MFR from 35 to 25.

TABLE 2

Coated $TiO_2$ pigment effect after 615 hrs of accelerated UV ageing

| Property | Units | Control | Example 1 |
|---|---|---|---|
| Loss in MD Grab Tensile | % | 32.99% | 7% |
| Loss in CD Grab Tensile | % | 36.57% | 21% |

Note:
Accelerated ageing conducted in a QUV weather-o-meter chamber. Cycle conditions: UV Temp = 70° C. for 8 hours; Condensation Temperature = 50° C. for 4 hours; Irradiation = 1.35 W/m²/min with a 340 nm lamp; and test length was 615 hours.

II. Insulative Properties

A 14-week field evaluation was performed with a muskmelon plantation. The crop cover used in the evaluation was an Agribon® product that was a 15 gsm spunbond-spunbond (SS) formed with a 25MFR polypropylene resin+3.5% UV (24% active) additive (equivalent to 8,400 ppm) and 0.15% white with 70% uncoated $TiO_2$. The field evaluation was carried out on a 2,400 square meter field with 2 sections, in which each section had the following 12 lines or rows: (i) 4 lines of plastic mulch, 1.8 m wide×28 m long each (Total of 7.2 m wide, 112 m long of protected crop); (ii) 1 line of tunnel cover with Agribon® (Agribon® A), 1.8 m wide, 112 m long; (iii) 1 line of tunnel cover with Agribon® (Agribon® B), 1.8 m wide, 112 m long; (iv) 3 lines of floating cover with Agribon® (Agribon® A), 1.8 m wide×23 m long each (Total of 5.4 m wide, 112 m long); and (v) 3 lines of floating cover with Agribon® (Agribon® B), 1.8 m wide×23 m long each (Total of 5.4 m wide, 112 m long).

The evaluation illustrated the several advantages upon review of the data obtained from the field evaluation. One advantage realized was related to plant development. In this regard, the rows covered with a floating cover and tunnels showed more plant development than uncovered rows (i.e., with plastic mulch only). Plants under tunnels showed a slight increase in plant size than the plants located under floating covers. Leaf area, leaf dry weight, shoot dry weight, and plant dry weight were beneficially higher in plants under tunnel and row cover than plants grown in soil plastic mulch alone. The number of flowers was similar among these treatments. An additional advantage was realized related to yield. That is, an additional 18% to 60% yield increase of fruits in crops covered with the Agribon® 15 gsm nonwoven was realized when compared to the plastic mulch. Fruit size was yet another advantage. For instance, the fruit size for Agribon® 15 gsm nonwoven covers were about 10% larger than those associated with the plastic mulch at day 81 of seeding. In this regard, there is an "earliness" or accelerated growth (up to 120% more at day 57) from the options protected with Agribon® 15 gsm nonwoven covers, as seen on the number of fruits with equatorial diameter of at least 2 cm. Observed temperatures were also advantageous as the observed air and soil temperatures were 3-7 degrees Celsius higher when the crop was protected with Agribon® 15 gsm nonwoven covers in tunnel and floating cover configurations. For instance, the observed increase in air and soil temperatures illustrate that the nonwoven provides a microclimate that holds the plant humidity and provides protection against lower temperatures in the field during the night time. Additionally, the average Brix sugar content grades in muskmelon fruit were 2.8% to 14.5% higher for Tunnel configurations than plastic mulch, which is also a sign of an increment in yield and earliness of the crop.

Figure 3:
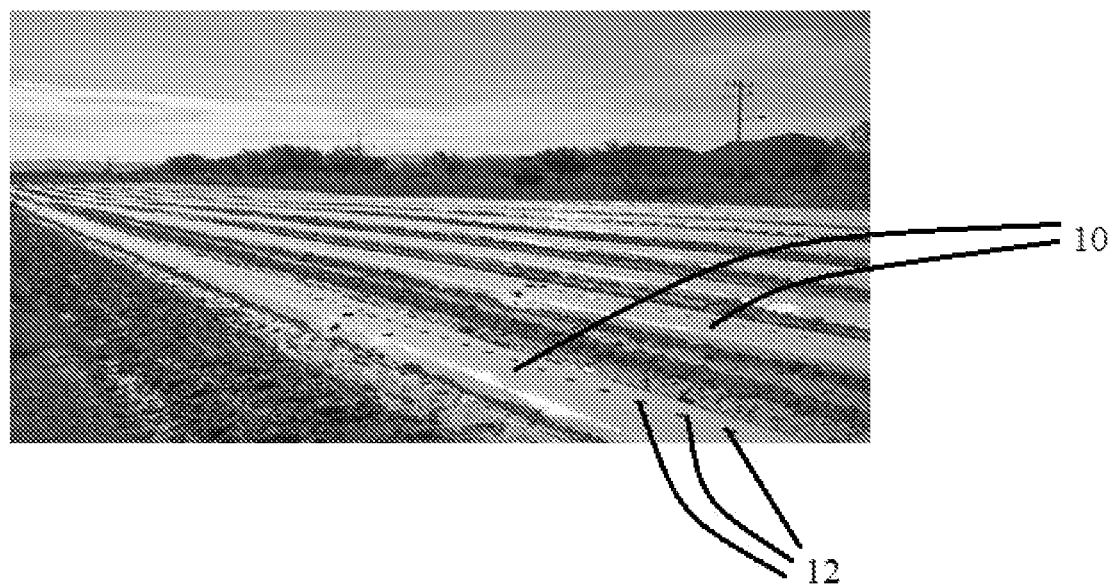
FIG. 3 shows rows covered with plastic mulch.
Figure 4:
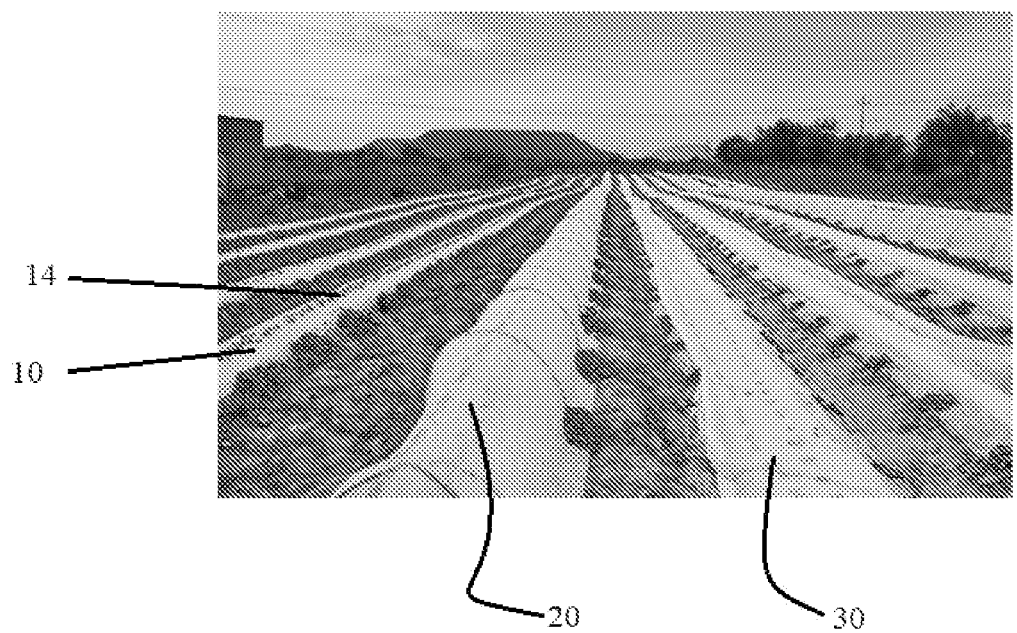
FIG. 4 shows rows covered with plastic mulch, rows covered with a nonwoven in a tunnel configuration, and rows covered with a nonwoven in a floating cover configuration.

FIG. 3 shows rows covered with plastic mulch 10 to isolate crops from weeds. The plastic mulch 10 includes holes 12 that enables growth of the plant. This configuration is intended to prevent that ability of weed to grow along with the crop or plant. FIG. 4 illustrates a plastic mulch 10 row, in which crops 14 are growing through holes 12. FIG. 4 also illustrates a tunnel configuration 20, in which the nonwoven cover does not directly touch the plants or crops. FIG. 4 also illustrates a floating cover configuration 30, in which the nonwoven cover directly touches the plants or crops. The image of FIG. 4 was taken 26 days after sowing and the planted crop was muskmelon.

Figure 5:
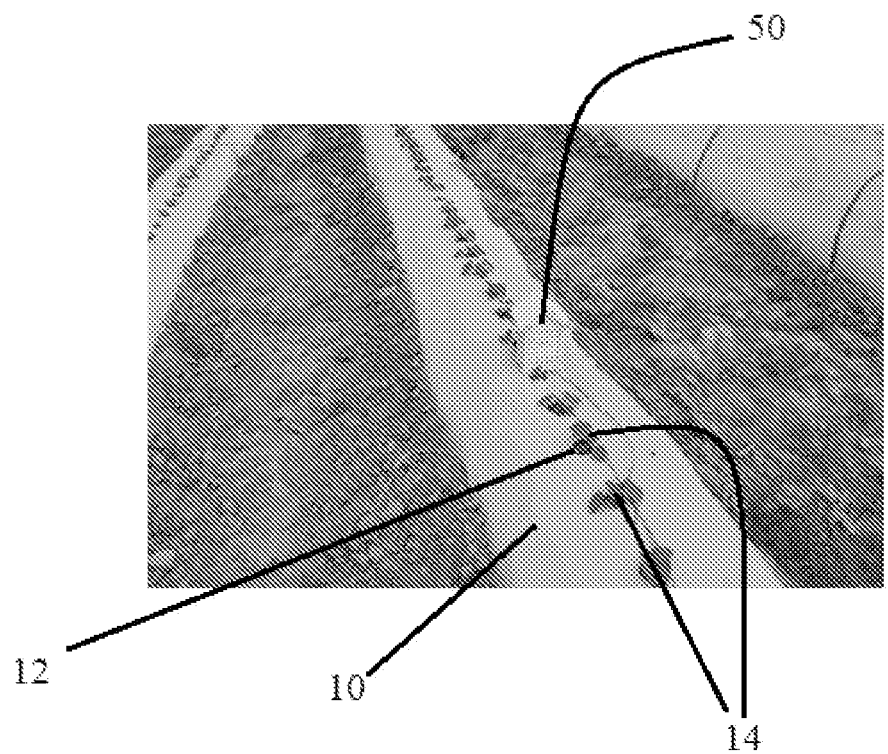
FIG. 5 shows a shelter with sensors located therein, in which the sensors are used for data logging of air and soil temperatures.
Figure 6:
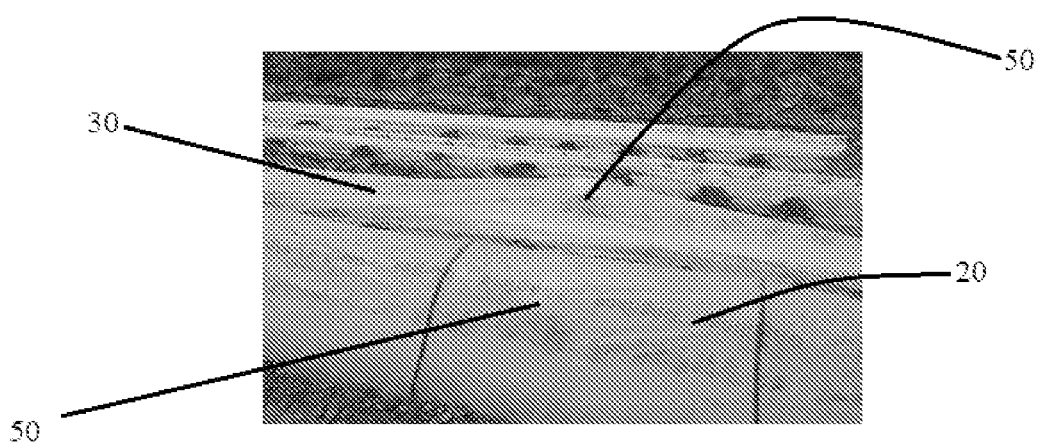
FIG. 6 shows a nonwoven cover in a tunnel configuration and a floating cover configuration.
Figure 7:
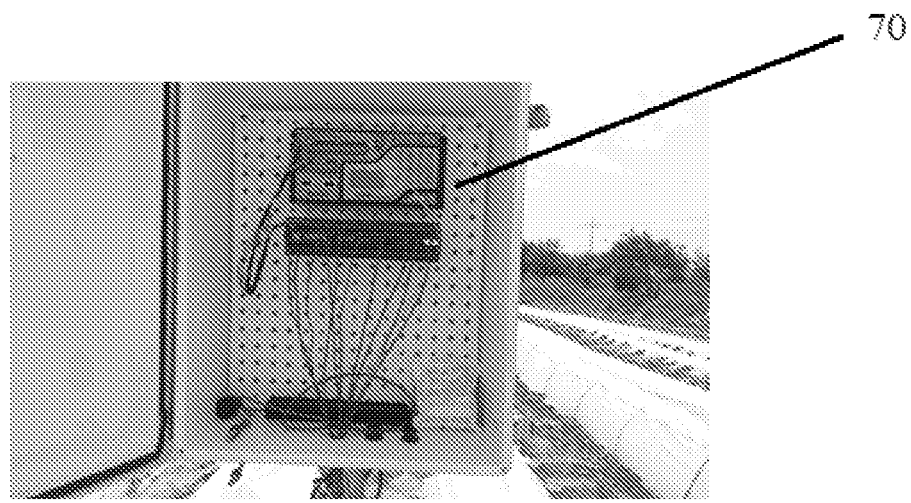
FIG. 7 shows a data logger connected to the sensors in the shelter(s) used to monitor air and soil temperatures.

FIGS. 5 and 6 illustrate how the temperature data was obtained for the evaluation. For instance, FIG. 5 shows a shelter 50 with sensors used for data logging of air and soil temperatures. In FIG. 5, the crop 14 is covered by mulch film 10, so the air temperature is the ambient or "uncovered" temperature. The crops show an average of 4 leafs after 26 days of sowing. FIG. 6 shows a tunnel cover 20 configuration with a shelter 50, which includes sensors therein, located underneath the nonwoven cover. FIG. 6 also shows a floating cover configuration 30 with a shelter 50, which includes sensors therein, located underneath the nonwoven cover. FIG. 7 shows a data logger 70 connected to the sensors in the shelter(s) 50, used to monitor air and soil temperatures.

The data from the evaluation are illustrated in Tables 3 and 4 below. With regard to Tables 3 and 4, the difference between Floating A and Floating B as well as the difference between Tunnel A and Tunnel B is that the nonwoven in the "A" conditions was formulated with 12% of Calcium Carbonate and the nonwoven in the "B" conditions was formulated without the Calcium Carbonate. However, data for "A" and "B" conditions may be considered as repeat points of tunnel or floating covers, showing the advantage vs. the uncovered or "plastic mulch" data.

TABLE 3

| | Air Temperatures (° C.) | | |
|---|---|---|---|
| Condition | Average (° C.) | Minimum (° C.) | Maximum (° C.) |
| Uncovered | 22.3 | 14.2 | 31.8 |
| Tunnel A | 25.2 | 16.5 | 36.8 |
| Floating A | 25 | 17.8 | 34.7 |
| Tunnel B | 25.9 | 16.9 | 38.6 |
| Floating B | 27.3 | 17.9 | 37.7 |

The data in Table 3 illustrates air temperatures of uncovered crops (i.e., plastic mulch only) vs. floating cover configurations and tunnel cover configurations. Table 3 shows that the average temperatures for the tunnel covers and the floating covers are beneficially 3 to 5° C. higher.

TABLE 4

| | Soil Temperatures ° C.) | | |
|---|---|---|---|
| Condition | Average (° C.) | Minimum (° C.) | Maximum (° C.) |
| Uncovered | 26 | 27.4 | 20.2 |
| Tunnel A | 26.8 | 32.6 | 22.1 |
| Floating A | 26.5 | 31.8 | 22.1 |
| Tunnel B | 27 | 33 | 22.6 |
| Floating B | 28.3 | 34.2 | 23 |

Table 4 illustrates data showing soil temperatures of uncovered crops (i.e., plastic mulch only) vs. floating cover configurations and tunnel cover configurations. Table 4 shows that the average temperatures for the tunnel covers and the floating covers are beneficially 1 to 2° C. higher.

In this regard, the temperature increase provided by the nonwoven covers translates in warmer temperatures for growing crops which reflects in "earliness" and an increase of yield of the harvest. In this field experiment, the fruit earliness is measured by the number of fruits that reach 2 cm in diameter or more. Table 5 illustrates the earliness for the fruit development in the crops protected with the nonwoven cover in both tunnel of floating cover configurations vs. plastic mulch, as seen on the number of fruits with equatorial diameter of at least 2 cm. The floating and tunnel coverings shows at least 27% more fruits to reach 2 cm in diameter vs. plastic mulch after day 50 form sowing. Also, there is an increment of fruit yield in crops as shown in table 6, which illustrates the respective yields of fruit from Agribon® 15 gsm nonwoven covers with an improvement from 18.5% to 58.7%, compared to the plastic mulch.

Figure 8A:
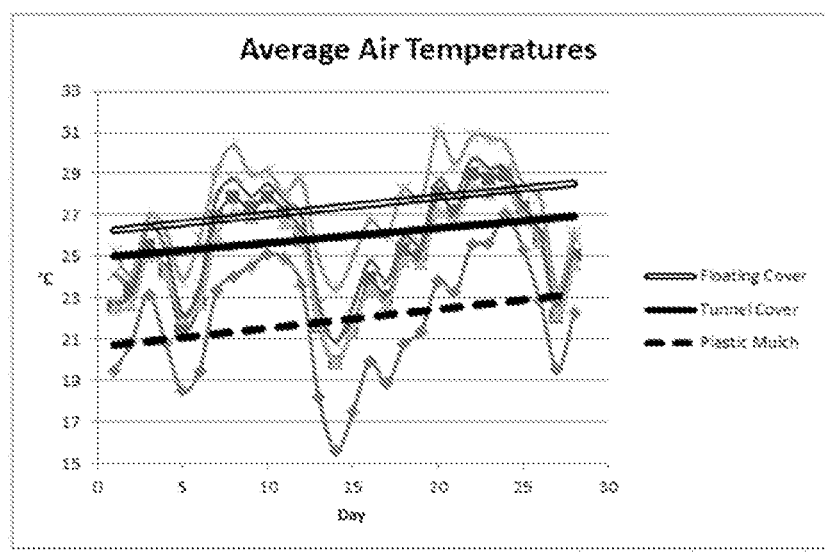
FIG. 8A shows data for average air temperatures of respective crop planting regions in a crop planting site.
Figure 8B:
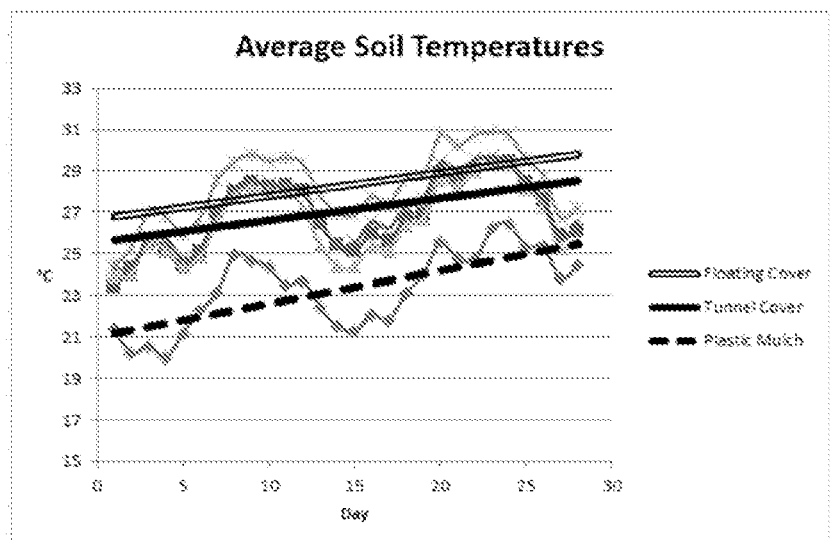
FIG. 8B shows data for average soil temperatures of respective crop planting regions in a crop planting site.

FIG. 8A graphically illustrates the average air temperatures for the present evaluation. In FIG. 8A, the trend lines show the average air temperatures at the mulch (lower dot line), the tunnel cover (continuous line, middle) and the floating cover (double line, top. FIG. 8B graphically illustrates the average soil temperatures of the present evaluation. In FIG. 8B, the trend lines show the average soil temperatures at the mulch (lower dot line), the tunnel cover (continuous line, middle), and the floating cover (double line, top).

TABLE 5

Number of Fruits with an ecuatorial diameter of at least 2 cm. Days after Sowing:

|  | Day 50 | % vs. plastic mulch | Day 57 | % vs. plastic mulch | Day 64 | % vs. plastic mulch | Day 71 | % vs. plastic mulch |
|---|---|---|---|---|---|---|---|---|
| Plastic Mulch | 22 | 0% | 75 | 0% | 223 | 0% | 260 | 0% |
| Tunnel A | 52 | 136% | 125 | 67% | 272 | 22% | 319 | 23% |
| Floating A | 36 | 64% | 172 | 129% | 262 | 17% | 285 | 10% |
| Tunnel B | 60 | 173% | 203 | 171% | 281 | 26% | 293 | 13% |
| Floating B | 28 | 27% | 164 | 119% | 225 | 1% | 266 | 2% |

TABLE 6

| Treatment | No. of Fruits/ 100 Plants (#) | Fuit weight/ 100 plants (kg) | Fruit Yield (Tons/Ha) | Additional yield vs. plastic mulch | Additional yield vs. plastic mulch (%) |
|---|---|---|---|---|---|
| Plastic Mulch | 132 | 2,188 | 48.7 | — | — |
| Tunnel A | 209 | 3,480 | 77.3 | 28.6 | 58.7 |
| Floating A | 202 | 3,055 | 67.9 | 19.2 | 39.4 |
| Floating B | 190 | 2,828 | 62.8 | 14.1 | 31.0 |
| Tunnel B | 165 | 2,597 | 57.7 | 9.0 | 18.5 |

Figure 9:
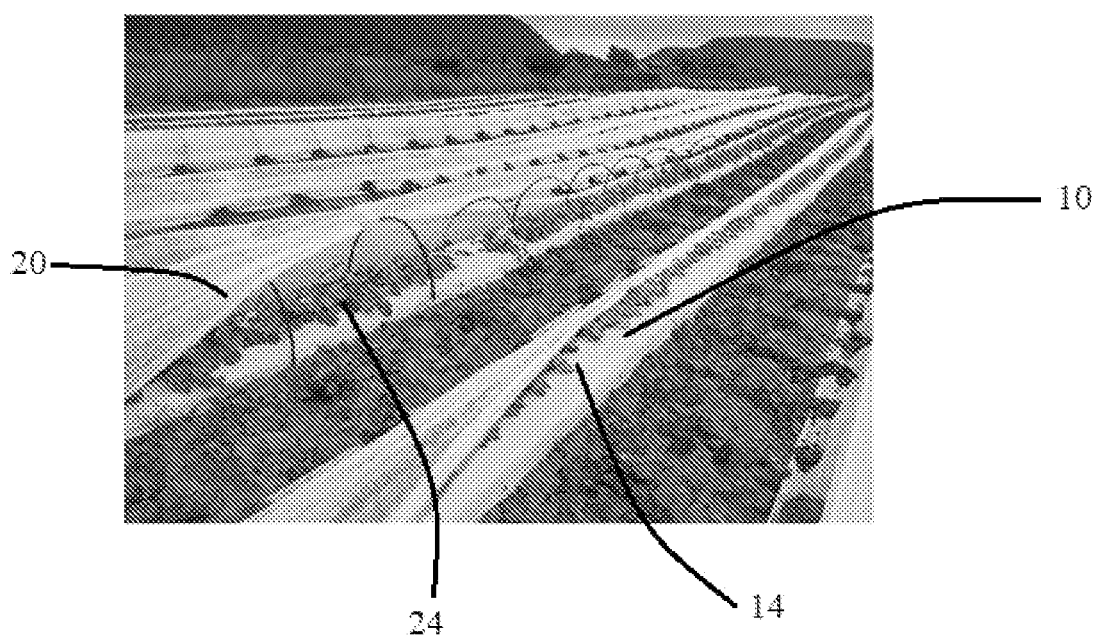
FIG. 9 is an image taken 55 days after sowing with the covers removed to visually inspect the growth of the planted crops when 50% of the plants showed flowers.

The evaluation illustrating the foregoing results was visually confirmed as shown by FIG. 9. In particular, the image from FIG. 9 was taken 55 days after sowing with the covers removed to visually inspect the growth of the planted crops when 50% of the plants showed flowers. FIG. 9 illustrates a row that was covered with plastic mulch 10 in which the planted crops 14 are relatively smaller and have less leaf area in comparison to a row that was covered by the Agribon® 15 gsm nonwoven cover in a tunnel cover 20 configuration that provided planted crops 24. Table 7 illustrates data regarding the effect of the row covers/tunnel in leaf area of planted muskmelon. A significant increase of leaf area in cm$^2$ of the tunnel and floating cover configurations vs. mulch is illustrated in Table 7.

TABLE 7

| Treatment | Time of removal | Leaf area cm$^2$ | % more Leaf area vs mulch |
|---|---|---|---|
| Plastic mulch alone (PM) | No row cover | 1282 | — |
| PM+ tunnel row cover A | 34 days after sowing | 1601 | 25% |
| PM+ floating cover | 34 days after sowing | 1938 | 51% |
| PM+ tunnel row cover B | 38 days after sowing | 1535 | 20% |
| PM+ floating cover B | 38 days after sowing | 1478 | 15% |

As shown in Table 7, the % increase in leaf area, in accordance with certain embodiments of the invention, ranged from at least 15% to as much as 51%.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
   at least one nonwoven layer comprising a plurality of fibers comprising a polymeric material having a melt flow rate (MFR) of less than about 40 g/10 min according to ASTM D1238 (2.16 kg at 230° C.);
   the plurality of fibers includes (i) one or more ultraviolet radiation protective agents (UVPA), and (ii) one or more inorganic pigments comprising an inert coating thereon, and wherein the polymeric material comprises a synthetic polymer or blend of two or more synthetic polymers, and wherein the plurality of fibers includes from 0.8% to 20% by weight of the one or more UVPAs;
   the one or more UVPAs is at least one hindered amine light stabilizer (HALS) selected from a 'N—H'-HALS, a 'N—R'-HALS, a 'N—OR'-HALS, or any combination thereof; wherein 'N' is a nitrogen atom, 'H' is a hydrogen atom, and 'R' comprises a saturated aliphatic radical, an unsaturated aliphatic radical, a saturated aromatic radical, or an unsaturated aromatic radical.

2. The nonwoven fabric of claim 1, wherein the polymeric material comprises a polyolefin.

3. The nonwoven fabric of claim 1, wherein the at least one HALS comprises (i) poly [[6-[(1,1,3,3-tetramethylbutyl)amino]-1,3,5-triazine-2,4-diyl][(2,2,6,6-tetramethyl-4-piperidinyl)imino]-1,6-hexanediyl [(2,2,6,6-tetramethyl-4-piperidinyl)imino]]), (ii) hexadecyl 3,5-bis-tert-butyl-4-hydroxybenzoate, or (iii) both (i) and (ii).

4. The nonwoven fabric of claim 1, wherein the at least one HALS has an average molecular weight from 2000 to 5000 g/mol.

5. The nonwoven fabric of claim 1, wherein the one or more inorganic pigments comprise titanium dioxide particles; wherein the inert coating comprises a silicon oxide; an aluminum oxide; or a zirconium oxide.

6. The nonwoven fabric of claim 5, wherein the plurality of fibers comprises from 0.8% to 18% % by weight of the one or more inorganic pigments.

7. The nonwoven fabric of claim 1, wherein a ratio between the one or more UVPAs and the one or more inorganic pigments comprises from about 100:1 to about 10:1 based on weight.

8. The nonwoven fabric of claim 1, wherein the plurality of fibers comprises spunbond fibers, meltblown fibers, staple fibers, or any combination thereof.

9. The nonwoven fabric of claim 8, wherein the at least one nonwoven layer comprises two or more layers, and wherein the nonwoven fabric has a basis weight from about 5 to about 40 grams-per-square meter (gsm).

10. The nonwoven fabric of claim 1, wherein the nonwoven fabric has one of more of the following: (i) a machine-direction grab tensile strength from about 2 to about 20 lb/in according to INDA/EDANA Test Method WSP 100.1 or Test Method ASTM D5034; (ii) a cross-direction grab tensile strength from about 1 to about 15 lb/in according to INDA/EDANA Test Method WSP 100.1 or Test Method ASTM D5034; (iii) a machine-direction tear value from about 1 to about 15 lb according to INDA/EDANA Test Method WSP 100.2 or Test Method ASTM 5733; and (iv) a cross-direction tear value from about 1 to about 15 lb according to INDA/EDANA Test Method WSP 100.2 or Test Method ASTM 5733.

11. The nonwoven fabric of claim 1, wherein the nonwoven fabric has an average air permeability of no greater than 13,000 l/m²/s according to Test Method INDA/EDANA WSP 70.1 or ASTM D737.

12. A method of enhancing crop growth, comprising: covering a crop planting site with a nonwoven fabric comprising at least one nonwoven layer comprising a plurality of fibers comprising a polymeric material having a melt flow rate (MFR) of less than about 40 g/10 min according to ASTM D1238 (2.16 kg at 230° C.);
wherein the plurality of fibers includes (i) one or more ultraviolet radiation protective agents (UVPA), and (ii) one or more inorganic pigments comprising an inert coating thereon, and wherein the polymeric material comprises a synthetic polymer or blend of two or more synthetic polymers, and wherein the plurality of fiber include 0.8% to 20% by weight of the one or more UVPAs;
the one or more UVPAs is at least one hindered amine light stabilizer (HALS), such as a 'N—H'-HALS, a 'N—R'-HALS, a 'N—OR'-HALS, or any combination thereof; wherein 'N' is a nitrogen atom, 'H' is a hydrogen atom, and 'R' comprises a saturated aliphatic radical, an unsaturated aliphatic radical, a saturated aromatic radical, or an unsaturated aromatic radical; and
wherein the crop planting site comprises one or more crops planted thereon.

13. The method of claim 12, wherein covering the crop planting site comprises applying the nonwoven fabric directly or indirectly over at least a portion of the crop planting site prior to emergence of the one or more crops.

14. The method of claim 13, wherein the nonwoven fabric overlies the crop planting site for a total time period of at least about 1800 hours.

15. The method of claim 12, wherein covering the crop planting site comprises applying the nonwoven fabric directly or indirectly over at least a portion of the crop planting site after emergence of the one or more crops.

16. The method of claim 15, wherein the nonwoven fabric overlies the crop planting site for a total time period of at least about 1800 hours.

17. The method of claim 12, further comprising inspecting the one or more crops prior to expiration of the total time period.

18. The method of claim 16, wherein inspecting the one or more crops comprises removing at least a portion of the nonwoven fabric, viewing the one or more crops, and re-applying the nonwoven fabric directly or indirectly over the top of the crop planting site.

19. The method of claim 12, further comprising harvesting the one or more crops.

20. The method of claim 12, wherein the one or more crops comprise watermelons, muskmelons, squash, chili pepper, strawberries, cucumber, potato, bananas, cucurbitaceous crops, or any combination thereof.

* * * * *